(12) United States Patent
Kusko et al.

(10) Patent No.: US 12,105,834 B2
(45) Date of Patent: Oct. 1, 2024

(54) USER PRIVACY FOR AUTONOMOUS VEHICLES

(71) Applicant: International Business Machines Corporation, Armonk, NY (US)

(72) Inventors: Mary P. Kusko, Hopewell Junction, NY (US); Franco Motika, Hopewell Junction, NY (US); Eugene Atwood, Housatonic, MA (US)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 16/937,652

(22) Filed: Jul. 24, 2020

(65) Prior Publication Data

US 2022/0027501 A1 Jan. 27, 2022

(51) Int. Cl.
*G06F 21/62* (2013.01)
*B60W 40/08* (2012.01)
*G06Q 10/02* (2012.01)

(52) U.S. Cl.
CPC ......... *G06F 21/6245* (2013.01); *B60W 40/08* (2013.01); *G06Q 10/02* (2013.01); *B60W 2540/043* (2020.02); *B60W 2540/045* (2020.02); *B60W 2540/221* (2020.02); *B60W 2556/10* (2020.02)

(58) Field of Classification Search
CPC .............. G06F 21/6245; B60W 40/08; B60W 2540/043; B60W 2556/10; B60W 2540/045; B60W 2540/221; G06Q 10/02
USPC .......................................................... 726/27
See application file for complete search history.

(56) References Cited

U.S. PATENT DOCUMENTS

| 6,249,740 | B1 | 6/2001 | Ito |
| 6,301,533 | B1 * | 10/2001 | Markow .............. G07C 5/0883 |
| | | | 701/32.4 |
| 6,502,022 | B1 | 12/2002 | Chastain |
| 8,965,624 | B2 | 2/2015 | Hosein et al. |
| 9,032,493 | B2 | 5/2015 | Lortz et al. |
| 10,373,257 | B1 * | 8/2019 | Iqbal ..................... B60W 40/09 |
| 10,949,830 | B1 | 3/2021 | Gaudin |
| 2003/0088647 | A1 | 5/2003 | ShamRao |
| 2010/0205667 | A1 | 8/2010 | Anderson et al. |
| 2011/0320495 | A1 | 12/2011 | Levy-Yrusta et al. |
| 2013/0013193 | A1 | 1/2013 | Raab |
| 2014/0207369 | A1 | 7/2014 | Yuasa |

(Continued)

FOREIGN PATENT DOCUMENTS

WO WO-2010104770 A2 * 9/2010 ............... B60K 6/12

OTHER PUBLICATIONS

Adaptive Sensor Fusion of Camera, GNSS and IMU for Autonomous Driving Navigation Weining Ren; Kun Jiang; Xinxin Chen; Tuopu Wen; Diange Yang 2020 4th CAA International Conference on Vehicular Control and Intelligence (CVCI) (Year: 2020) (Year: 2020).*

(Continued)

*Primary Examiner* — Bryan Y Lee
(74) *Attorney, Agent, or Firm* — Stosch Sabo (57) ABSTRACT

Data privacy for data associated with traveling in a vehicle that has access to passenger data, vehicle location data, vehicle navigation data, peripheral data; and/or itinerary data. Privacy is achieved by data classification and corresponding data security preferences and/or user selection including end of trip data disposition actions.

3 Claims, 6 Drawing Sheets

(56) References Cited

U.S. PATENT DOCUMENTS

| | | | |
|---|---|---|---|
| 2014/0358394 A1* | 12/2014 | Picciotti | G06F 21/552 |
| | | | 701/1 |
| 2015/0304331 A1* | 10/2015 | Nakagawa | H04W 12/02 |
| | | | 726/28 |
| 2015/0363986 A1 | 12/2015 | Hoyos | |
| 2016/0153792 A1* | 6/2016 | Schulz | G06F 13/362 |
| | | | 701/461 |
| 2016/0259848 A1 | 9/2016 | Mohammed et al. | |
| 2016/0269418 A1* | 9/2016 | Sangary | G06F 21/44 |
| 2017/0132016 A1* | 5/2017 | Zilberman | G06F 9/451 |
| 2017/0154270 A1 | 6/2017 | Lindman et al. | |
| 2018/0130347 A1 | 5/2018 | Ricci | |
| 2018/0141562 A1 | 5/2018 | Singhal | |
| 2018/0158328 A1 | 6/2018 | Benhammou | |
| 2018/0183610 A1 | 6/2018 | Kravitz | |
| 2018/0188726 A1 | 7/2018 | Newman | |
| 2019/0232974 A1* | 8/2019 | Reiley | G06V 20/597 |
| 2020/0051346 A1* | 2/2020 | Zhang | G06F 21/6245 |
| 2020/0074853 A1* | 3/2020 | Miller | G08G 1/012 |
| 2020/0084193 A1* | 3/2020 | Beaurepaire | G05D 1/0287 |

OTHER PUBLICATIONS

Adaptive Sensor Fusion of Camera, GNSS and IMU for Autonomous Driving Navigation Weining Ren; Kun Jiang; Xinxin Chen; Tuopu Wen; Diange Yang 2020 4th CAA International Conference on Vehicular Control and Intelligence (CVCI) (Year: 2020).*
Glancy, Dorothy J., "Privacy in Autonomous Vehicles", Santa Clara Law Review, vol. 52 | No. 4, Article 3, Dec. 14, 2012, Santa Clara University School of Law, 70 pages.

* cited by examiner

DATA SECURITY PREFERENCES

| DATA CLASS | PREFERENCE |
|---|---|
| ● CUSTOMER ID | ● DELETE AT END<br>○ DO NOT STORE<br>○ HOLD FOR 72 HRS |
| ● TRAVEL SCHEDULE | ○ DELETE AT END<br>○ DO NOT STORE<br>● HOLD FOR 72 HRS |
| | |

USER PRIVACY FOR AUTONOMOUS VEHICLES

BACKGROUND

The present invention relates generally to the field of autonomous vehicles, and more particularly to privacy for owners and operators of autonomous vehicles.

Autonomous Vehicle, also referred to as Vehicular Automation, involves the use of mechatronics, artificial intelligence, and multi-agent system to assist a vehicle's operator. These features and the vehicles employing them may be labeled as intelligent or smart. A vehicle using automation for difficult tasks, especially navigation, may be referred to as semi-autonomous. A vehicle relying solely on automation is consequently referred to as robotic or autonomous. After the invention of the integrated circuit, the sophistication of automation technology increased. Manufacturers and researchers subsequently added a variety of automated functions to automobiles and other vehicles.

SUMMARY

According to an aspect of the present invention, there is a method, computer program product and/or system that performs the following operations (not necessarily in the following order): (i) determining data collection parameters for collecting data inputs from a set of sensors during a trip to be performed by a vehicle, the sensors onboard the vehicle; (ii) collecting data inputs from the set of sensors operating during the trip according to the data collection parameters; (iii) classifying each data input of the collected data inputs as one of a set of data classifications; (iv) determining data security preferences including a set of data security actions corresponding to the set of data classifications; (v) taking a data security action on a set of data inputs classified a first data classification, the data security action being required according to the data security preferences; (vi) determining the trip has ended; and (vii) taking a disposition action on the set of data, the disposition action being required for the first data classification according to the data security preferences.

DETAILED DESCRIPTION

Some embodiments of the present invention are directed to data privacy for data associated with traveling in a vehicle that has access to passenger data, vehicle location data, vehicle navigation data, external-to-vehicle data, and/or itinerary data. Privacy is achieved by data classification and corresponding data security preferences including end of trip data disposition actions.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
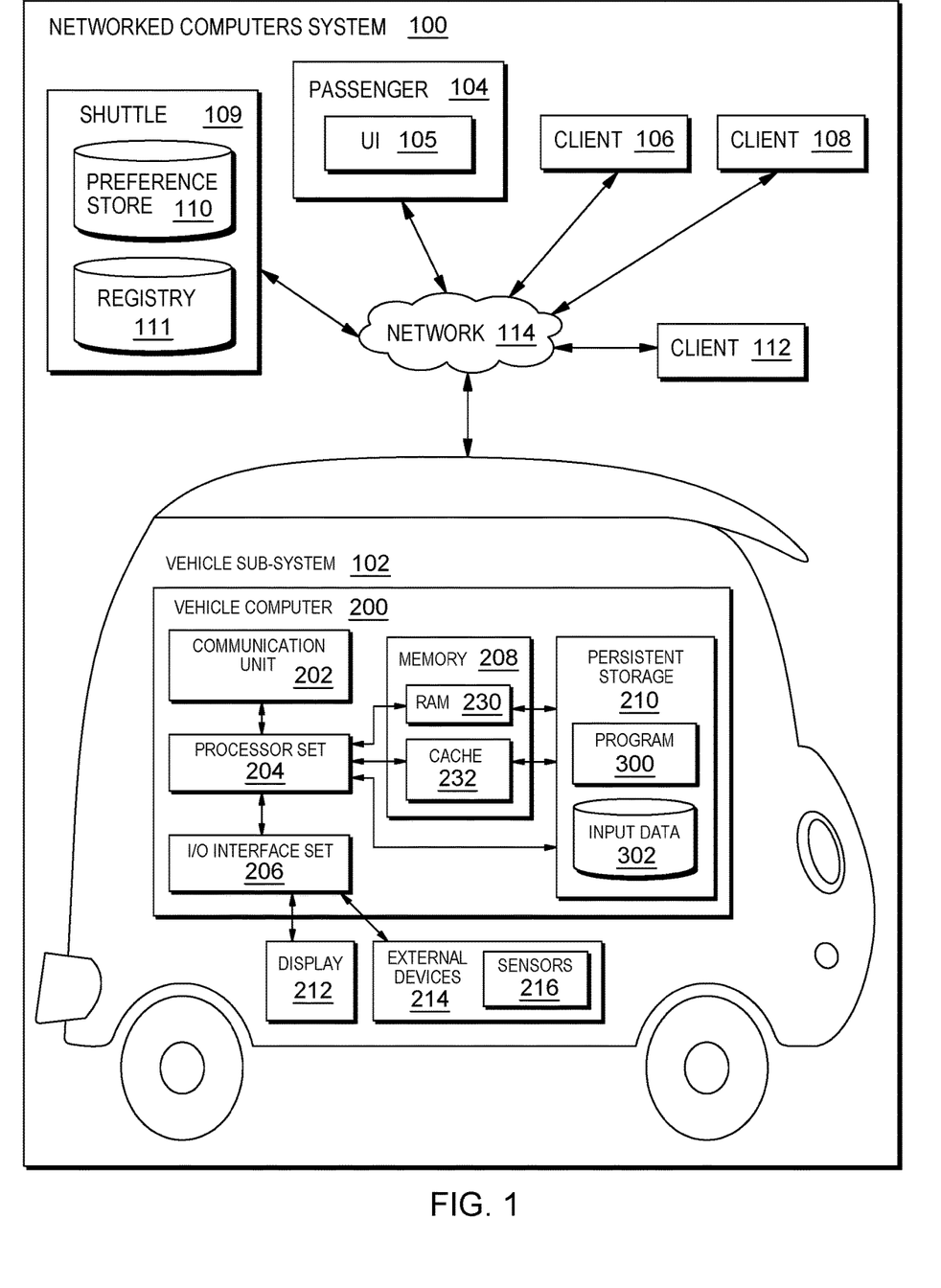
FIG. 1 is a block diagram view of a first embodiment of a system according to the present invention.

As shown in FIG. 1, networked computers system 100 is an embodiment of a hardware and software environment for use with various embodiments of the present invention. Networked computers system 100 includes: vehicle subsystem 102 (sometimes herein referred to, more simply, as subsystem 102); passenger subsystem 104, user interface (UI) 105; client subsystems 106, 108, 112; shuttle subsystem 109; preference store 110, registry store 111; and communication network 114. Subsystem 102 includes: vehicle computer 200; communication unit 202; processor set 204; input/output (I/O) interface set 206; memory 208; persistent storage 210; display 212; external device(s) 214; sensors 216, random access memory (RAM) 230; cache 232; program 300; and input data store 302.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with vehicle computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
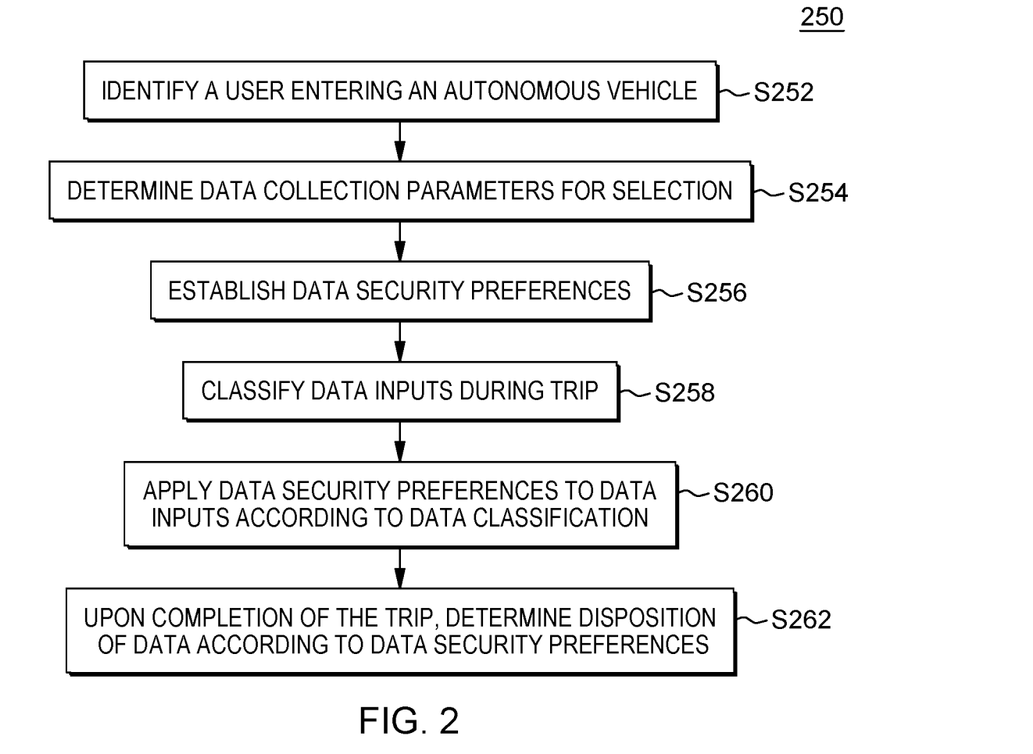
FIG. 2 is a flowchart showing a first embodiment method performed, at least in part, by the first embodiment system.
Figure 3:
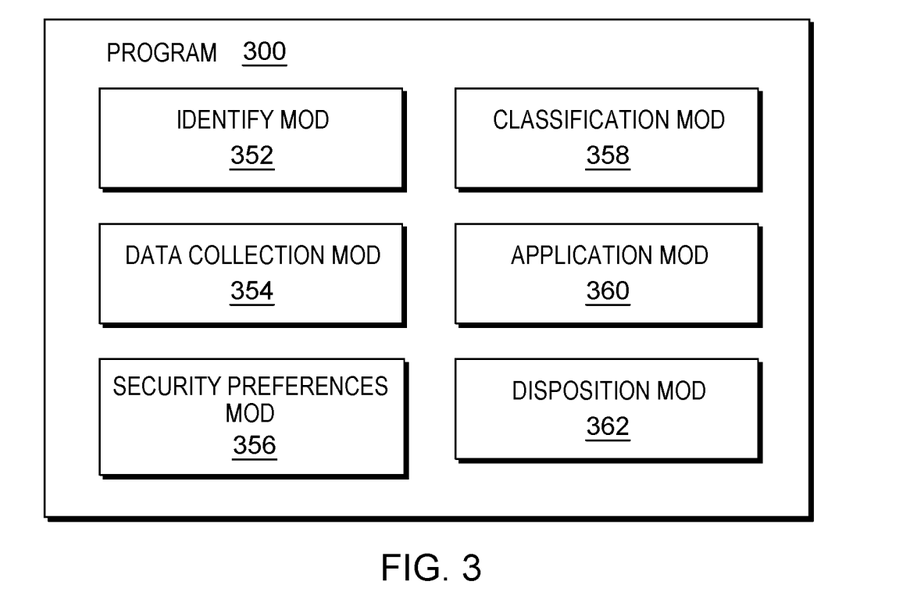
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIG. 1 (system of an embodiment of a hardware and software environment), FIG. 2 (method of operation blocks) and FIG. 3 (software blocks).

Processing begins at operation S252, where identify module ("mod") 352 identifies a user entering an autonomous vehicle. In this example, identity mod 352 communicates with passenger sub-system via network 114 to establish an identity of the user. Alternatively, the identify mode receives input data from sensors including a camera and processes images of the user for identification purposes. Further, in some embodiments, facial recognition software identifies the user based on images from the camera received as input data.

Processing proceeds to operation S254, where data collection mod 354 determines the data collection parameters for selection. In this example, data collection mod 354 within program 300 establishes two-way communication with preference storage 110 using network 114. Default data collection parameters are presented to the user via passenger sub-system for user selection. In some embodiments, a user is identified as a registered user by comparison of the user identity and/or credentials with personal information stored in registry 111. Users who are registered with the vehicle service may store preferences in the preference store. Alternatively, the user interfaces with the data collection mod via user interface 105 to provide data collection parameters and instructions.

Processing proceeds to operation S256, where security preferences mod 356 establishes the data security preferences. In this example, security preference mod 356 within program 300 establishes two-way communication with preference storage 110 using network 114 to identify pre-defined security preferences for each data input classification as pre-defined by the passenger. Alternatively, available security preferences are presented to the user on passenger sub-system 104 for selection via UI 105. Alternatively, the passenger is a registered user and has defined certain security parameters to be deployed when traveling by autonomous vehicle. Alternatively, a user selects security preferences according to data collection parameters with reference to classification of input data.

Processing proceeds to operation S258, where classification mod 358 classifies the data inputs during the trip. In this example, classification mod 358 within program 300 establishes two-way communication between preference storage 110 and input data store 302 using network 114. This two-way communication performs the classification process S258 stated above. Further in this example, the input data being collected according to data collection parameters is classified according to pre-defined classifications stored in preference store 110. Data classifications include, but are not limited to: (i) passenger-related personal data such as biometric data, identification data, and/or payment method; (ii) vehicle data; (iii) peripheral data (external-to-vehicle data such as external video and audio data); (iv) transponder data (vehicular or personal device); and/or (v) itinerary/travel schedule.

Processing proceeds to operation S260, where application mod 360 applies the data security preferences to the data inputs according to classifications of the data. In this example, application mod 360 takes specific security actions on data according to its classification where security preferences in preferences store 110 provide the actions to be taken. Accordingly, data inputs classified as personal data are, for example, not stored in input data store 302 while other data inputs classified as vehicle data are, for example, stored in the input data store. Further, some classifications may be encrypted according to the security preferences and stored in the input data store.

Processing ends at operation S262, where disposition mod 362, upon completion of the trip, determines the disposition of the data according to the data security preferences and/or direct user input. In this example, application mod 362 performs disposition of data stored in input data store 302 according to classification-based security preferences in preference store 110.

Figure 4:
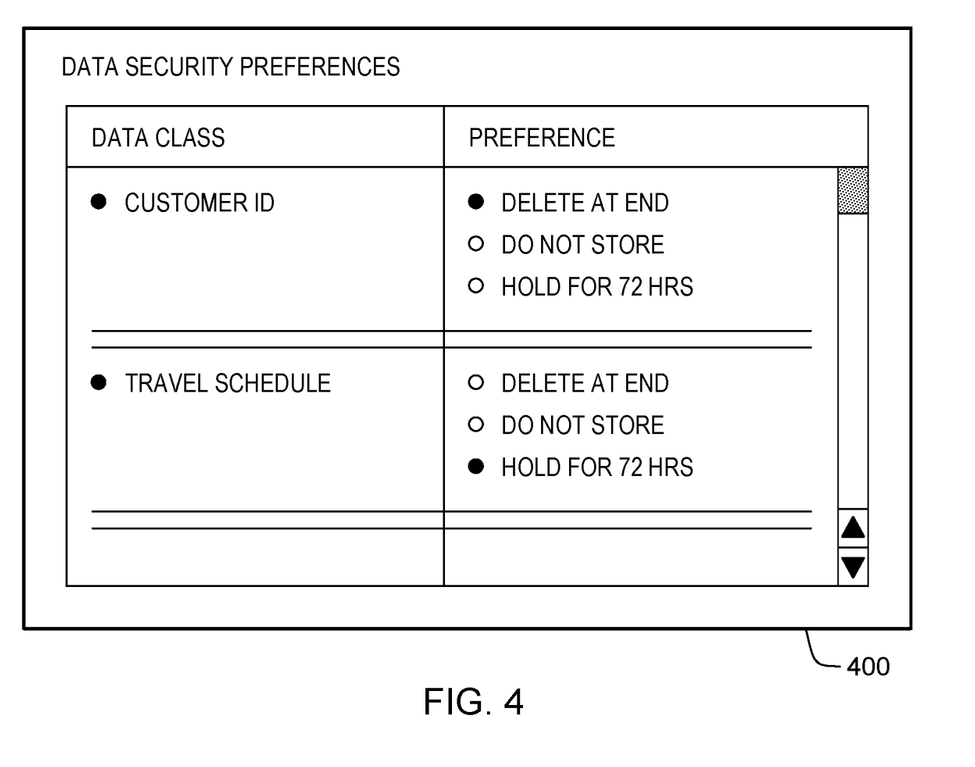
FIG. 4 is an example screenshot view generated by the first embodiment system.

FIG. 4 illustrates example screenshot 400 including a user interface selection of data security preferences as they relate to pre-defined data classifications. Shown are the data classifications "customer ID" and "travel schedule." Data collected from various sensors and/or associated with passenger registration includes data that may be classified as related to customer identification. In the screenshot, the user has selected "delete at end" of trip. Options include "do not store" and "hold for 72 hours." For the data class "travel schedule" the user has selected "hold for 72 hours." As shown in this illustration, there is a scroll feature that allows a user to scroll through various classifications and select corresponding data security action preferences. According to some embodiments of the present invention passenger and vehicle operator data is securely stored for warrant-based retrieval as an all-parties protection mechanism.

III. Further Comments and/or Embodiments

Some embodiments of the present invention recognize the following facts, potential problems and/or potential areas for improvement with respect to the current state of the art: (i) the user or client of an autonomous car service is expected to have their still and motion image(s), vocalizations, actions and associations recorded by sensors within the vehicle, on the vehicle and outside vehicle surroundings; (ii) the problem is that there is no process or method to provide a privacy service (or option) for individuals who want to protect their privacy and ensure that their words, data, actions, and images are used only with their permission; and (iii) vehicles today do not have the capability to appropriately protect the passenger data collected by autonomous vehicle services.

Some embodiments of the present invention may include one, or more, of the following operations, features, characteristics and/or advantages: (i) provides for the ability of the user of autonomous vehicles (driver manned or not) to select an option for enhanced privacy for users entering, exiting or being inside the vehicle; (ii) enhanced privacy is defined as the securing, by obsfucation and/or encryption, of certain specified vehicle sensor data; (iii) once specified, the vehicle data is encrypted according to a public key infrastructure (PKI) using public-key cryptography, or accomplished using another method, and is encrypted with the user's private key where audio, still imaging, and video are completely encrypted and other vehicle sensor data is selectively obfuscated; (iv) the client selects the type and degree of encryption for various types of data which are offered by the vendor (for example, the accuracy of the vehicle GPS (global positioning system) location may be reduced, and/or mass sensor data detail be obfuscated); (v) vehicle sensor data, which the vehicle operator/owner requires for maintaining the vehicle, is obfuscated but not to a degree where it is not useful; (vi) encrypted data can be retrieved by the user (customer) or by court order requiring the customer to surrender their private key; (vii) an important consideration is the certification by a vehicle vendor that all data, which could be used to identify or otherwise capture user data, has been identified and is subject to user controlled encryption, obfuscation and transmittal; (viii) vehicle owners and operators can be compliant with stated data privacy obligations; and (ix) intrusion detection is enhanced.

Some embodiments of the present invention may include but are not limited to the following autonomous vehicle sensors: (i) sensors related to the operation of the vehicle; (ii) temporal vehicle data; (iii) location; (iv) velocity; (v) torque; (vi) fuel usage; (vii) position; (viii) still image; (ix) motion image; (x) infrared imaging; (xi) audio; (xii) seat mass sensors; (xiii) radar imagery; (xiv) external-to-vehicle data (for example, audio, video); and (xv) biometric sensors (for example, fingerprint).

Some embodiments of the present invention also recognize that in the future, sensors which were not enumerated here, are also incorporated into some embodiments of the present invention and could include chemical sensors and other biometric sensors.

A method according to an embodiment of the present invention includes the following operations (not necessarily in the following order): (i) enables clients to protect their privacy in a customized manner while using transportation services, such as an autonomous livery service; (ii) users data is under controlled protection; (iii) there are various data types and for each, the client can choose the type of encryption; (iv) the client also controls the degree of obfuscation used with shared vehicle data (for instance, the accuracy of GPS coordinates may be reduced by an amount which is useful to the vehicle operator, but does not accurately geo-locate the client); (v) the accuracy can be recovered using the client private key; and (vi) other applications beyond autonomous vehicles are included such as public/private spaces, where an individual seeking privacy has entered into an agreement with the vendor.

Some embodiments of the present invention may include one, or more, of the following operations, features, characteristics and/or advantages: (i) supports a value statement that "the client owns their own data"; (ii) from the client's point of view, knowing what data may be collected and having control over that data is important; (iii) the client, by controlling and understanding what data may be collected and controlling the degree of protection, is protected from surprises; and (iv) companies can profit by licensing and/or promoting values including supporting personal privacy, (for example, auditing and compliance applications used by vehicle manufacturers and operators).

Some embodiments of the present invention may include one, or more, of the following operations, features, characteristics and/or advantages: (i) uses the vendor reservation mechanism, or in-vehicle input device, to specify the privacy requirement; (ii) the reservation mechanism typically requires the client to be known to the vendor, (for example, contact information, address, payment arrangements, etc.); (iii) during setting up a livery reservation, the client would select the desired privacy requirement; (iv) the customer would create their own private key (for example, a password) and would be provided by the vendor with the public key; (v) the client, on entering the vehicle, would enter their private key into a vehicle input device or over an encrypted cellular or wireless message at which time the vehicle data identified as private would be encrypted until the client exits the vehicle; (vi) the client would optionally be able to retrieve the encrypted data from the vendor; and (vii) protected data includes but is not limited to: (a) audio, (b) still image, (c) motion images, (d) fingerprint, (e) other data containing directly personally identifiable data, (f) indirectly identifiable data such as: (1) electronic communications, (2) precise car location, (3) client pick-up and drop-off locations, and (4) seat sensors.

Some embodiments of the present invention may include one, or more, of the following operations, features, characteristics and/or advantages pertaining to data types include: (i) vehicle monitors/sensors data (owned by service provider or vehicle manufacturer) that includes: (a) engine sensors (for example, oil, temperature, engine status, warnings messages, error messages, etc.), (b) internal sensors (for example, air conditioning, sound system, illumination, etc.), (c) external/internal vehicle (for example, window position, door status, lock status, external lights status, hood and boot/trunk status, mirrors, roof, shades, etc.), and (d) internal condition of vehicle (for example, before and after trip); (ii) internal vehicle data (owned by customer) including: (a) occupancy (for example, number of passengers, position in the vehicle, individual identification), (b) passenger's audio & video recordings, and any other biometric info, (c) conversations between occupants (for example, cell phone, etc.), (d) electronic communication (for example, Wi-Fi, Bluetooth, etc.), (e) medical or other emergency communication, and (f) merchandise carried (inside the car or inside the boot/trunk); (iii) external vehicle data (for example, some owned by customer, some owned by service provider, some owned by all including: (a) pickup, drop-off and intermediate stop locations. (b) route (from/to locations, number of stops, time of trip, etc.), (c) abnormal trip information (for example, unplanned termination, accident, or other emergency conditions), (d) recorded trip landmarks, and (e) external condition of vehicle (for example, before and after the trip); and (iv) financial identification data (owned by the provider, provided by the customer, considered as restricted use).

Some embodiments of the present invention may include one, or more, of the following operations, features, characteristics and/or advantages: (i) within the highly automated car, there are various data types (for example, some data is derived from sensors, some may be personal data such as user profile information); (ii) each automated car can have its own encryption and privacy controls; and (iii) while some embodiments apply to client data, it can also apply to the car owner or to individuals who are not covered under the vehicle privacy.

Figure 5:
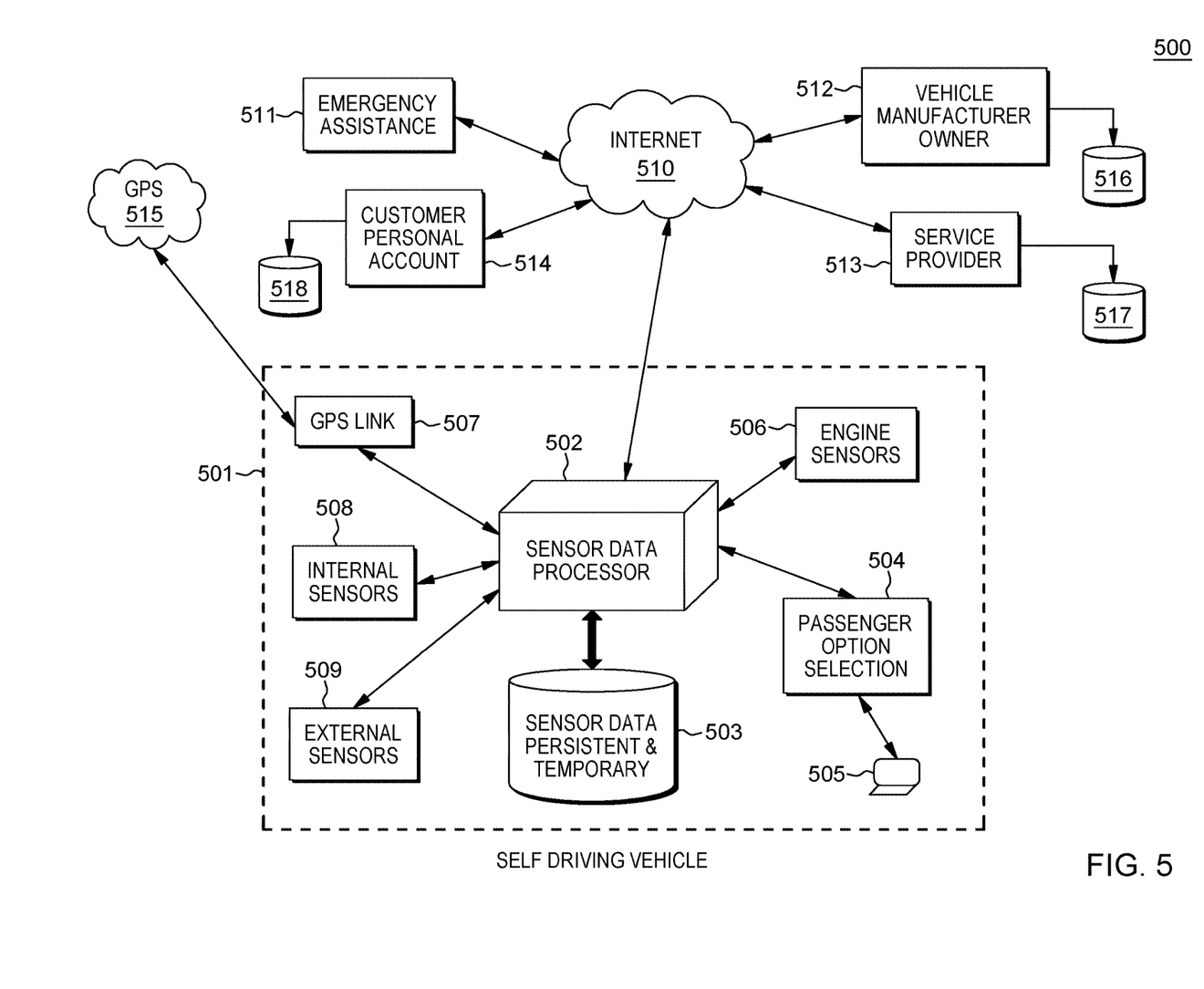
FIG. 5 is a system diagram of an embodiment of the present invention.

As shown in FIGS. 5, system diagram 500 shows a self-driving vehicle data privacy concept and includes the following components: self-driving or autonomous vehicle 501; the brains or central command of the data and the privacy controls 502; the data collected by the sensors or personal data 503; the sharing methods, privacy (encryption) options selected by the user 504; the interface where the user specifies the options 505; engine related sensors that collect data 506; a link to GPS 507; non-engine sensors monitoring and measuring data inside the vehicle 508; sensors monitoring and measuring data outside the vehicle 509; the worldwide internet 510; if needed, access to emergency assistance 511; a link to the manufacturer of the vehicle 512, including data storage 516; a link to the person/company who contracted the service 513, including data storage 517; the user or clients personal account and history (previous transactions) 514, including data storage 518; and GPS 515.

Again referring to FIG. 5, some embodiments of the present invention recognize: (i) passenger option selection block 504 includes sensor enable/disable, encryption, delete/save/copy, etc. operations; (ii) engine sensors block 506 includes operational status indicator, safety, temperature, etc. operations; (iii) GPS link block 507 includes location, stops, times, trip, etc. operations; (iv) internal sensors block 508 includes video, audio, identification information, etc. operations; and (v) external sensors block 509 includes proximity, climate, video, audio, etc. operations.

Still referring to FIG. 5, some embodiments of the present invention recognize the following operations being performed by sensor data processor 502 which include: (i) capture the data (using sensors); (ii) classifying the data including: (a) client data. (b) vehicle data—manufacturer, (c) vehicle data—vehicle/fleet owner, and (d) peripheral data; and (iii) provide right level of encryption/privacy including: (a) can it be shared, if so, with who (b) extra encryption due to certain security concerns, (c) controllable by the user (where it fits), and (d) owner of the car verses occupant of the car.

Figure 6:
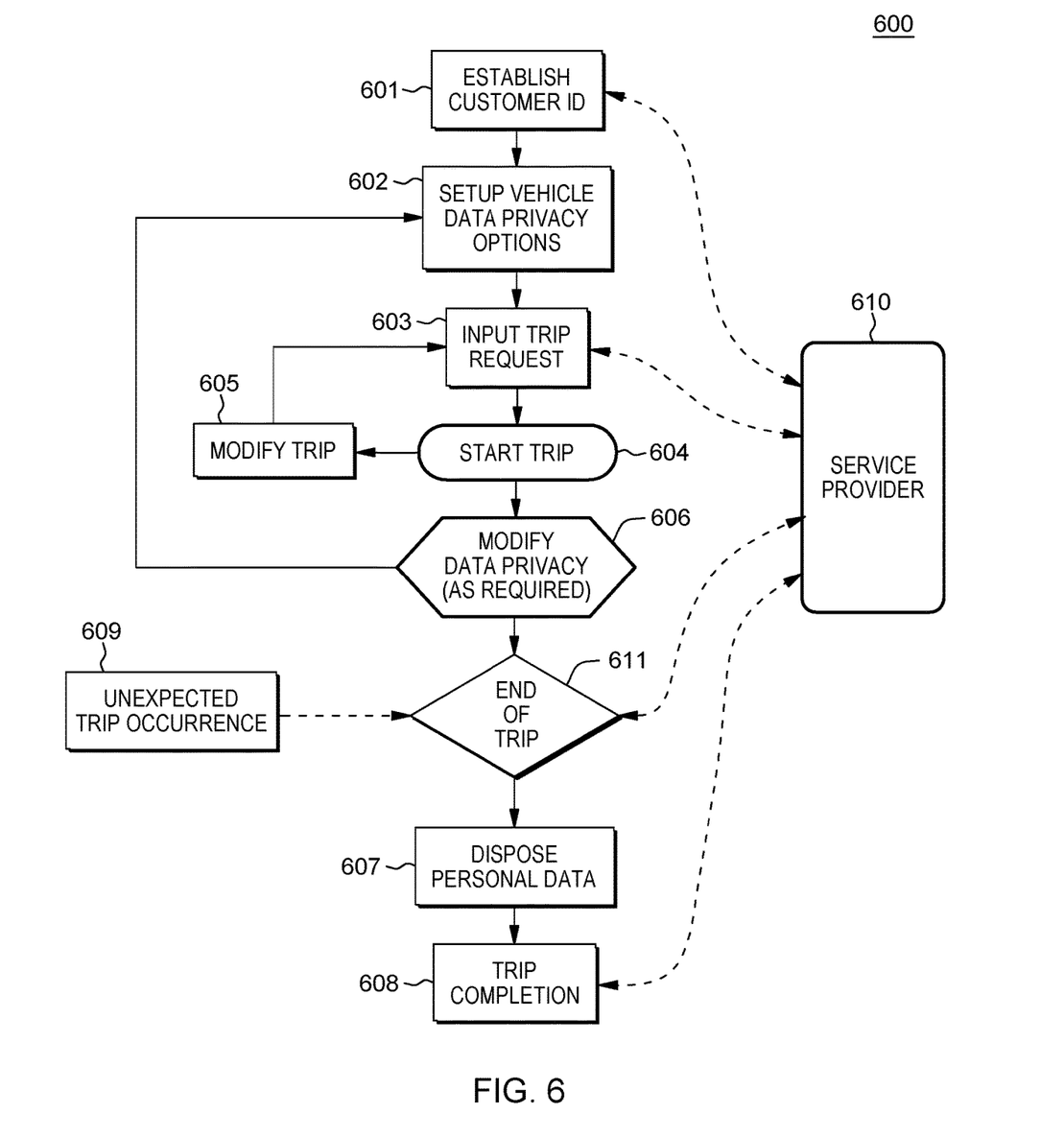
FIG. 6 is another system diagram of an embodiment of the present invention.

As shown in FIGS. 6, system diagram 600 shows a self-driving car data privacy process and includes the following components: identify the client from the database 601; based on the client's data, select the appropriate data privacy options 602; based on the client's originally planned data or modified data, code in the details of the requested trip 603; start the trip 604; the client can alter the trip which will then update the selected data accordingly 605; the client can alter the privacy settings which then update the selected data accordingly 606; end of trip decision 611; dispose of any data classified for disposal 607; conclude trip 608; unexpected occurrence which causes a premature end to the trip such as an accident, vehicle break down, etc. 609; and the central database where all the transactions are communicated to/from 610.

In some embodiments of the present invention, FIG. 6 assumes that the client has already established an account with a service provider having identification, financial and privacy preferences.

Figure 7:
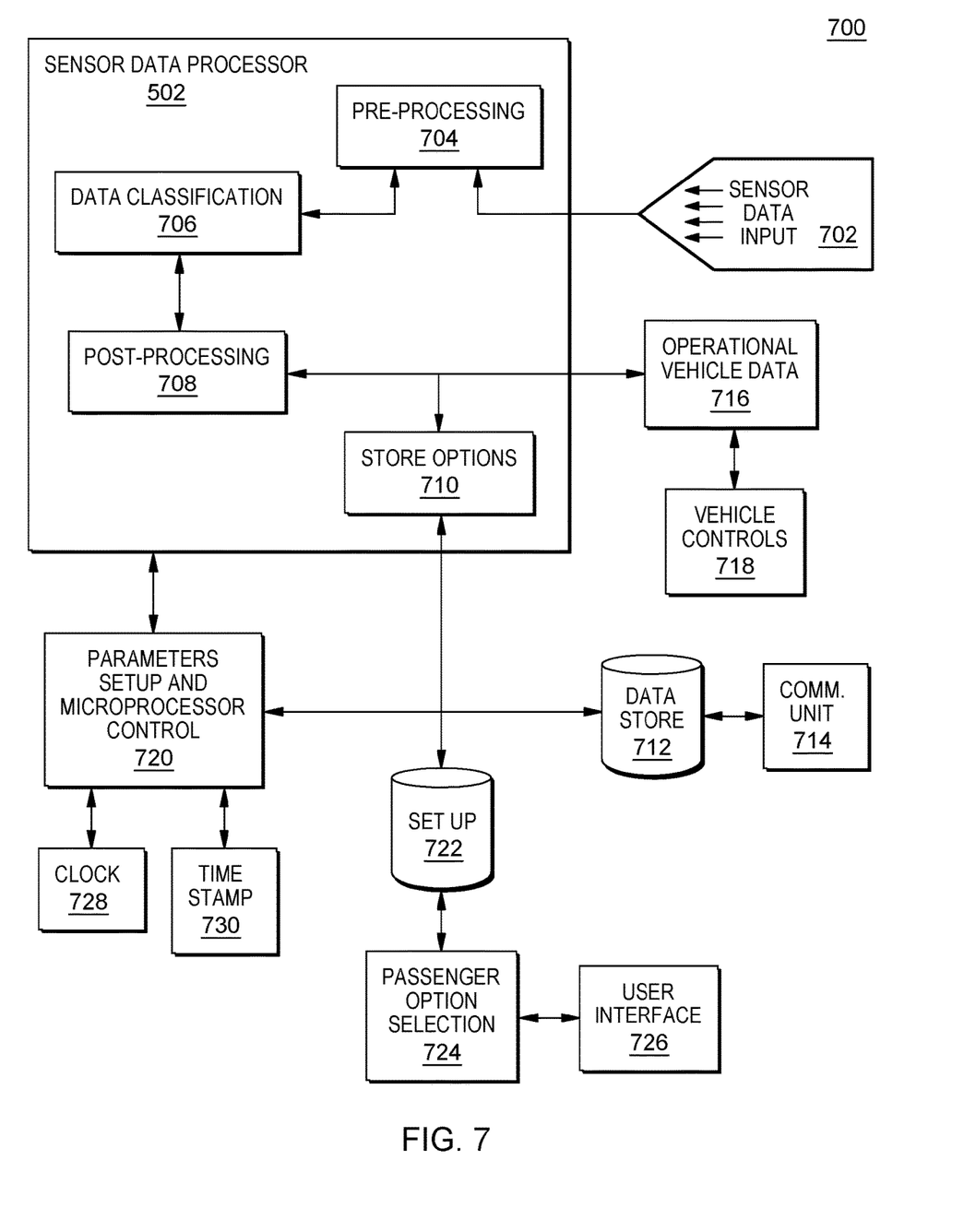
FIG. 7 is another system diagram of an embodiment of the present invention.

As shown in FIG. 7, system diagram 700 shows details about sensor data processor 502 which includes: sensors data input device 702; pre-processing block 704; data classification block 706; post-processing block 708; store options block 710 (includes permanent storage, temporary storage and no storage); persistent and temporary data memory 712; communications block 714; operational vehicle data block 716; vehicle controls block 718; parameters setup and microprocessor control block 720; parameters and options setup store 722; passenger option selection block 724; and user interface 726.

Again referring to FIG. 7, some embodiments of the present invention recognize that the following components communicate via two-way communication with sensor data processor 502: sensors data input device 702; pre-processing block 704; data classification block 706; post-processing block 708; store options block 710; persistent and temporary data memory 712; parameters setup and microprocessor control block 720; and passenger option selection block 724. In addition, operational vehicle data block 716 communicates directly with vehicle controls 718 and the on to the user/drive of the vehicle. The remainder of the communications paths are as illustrated via the illustrated communications fabric.

Parameter setup module 720 operates to monitor time via clock module 728 and output data to time stamp module 730.

Some embodiments of the present invention may include one, or more, of the following operations, features, characteristics and/or advantages: (i) implemented as a combination of software processes executing within the CPU (central processing unit) based environment of the self-driving vehicle; (ii) the CPU would support encryption of sensor data and saving of said encrypted data (based on customer preferences); and (iii) other sensor data would have, for instance, the precision removed from the GPS coordinates, where the unaltered data would remain unencrypted for the vehicle operator and the full precision GPS data would be encrypted and included in the client data.

While this concept is written targeting vehicles, it can be expanded to any publicly accessible private spaces in an alternate embodiment.

Some embodiments of the present invention may include one, or more, of the following operations, features, characteristics and/or advantages associated with a user renting an autonomous vehicle, manned or not: (i) user controlled selection of data type and degree of protection applied to data generated by vehicle sensors; and (ii) user selects enhanced privacy option(s) within the booking system or in-vehicle, resulting in encryption of user identified sources of data and it's disposition.

Some embodiments of the present invention may include one, or more, of the following operations, features, characteristics and/or advantages: (i) uses prearranged authentication, such as a password, to authenticate the user; (ii) the users privacy choices are also prearranged, but can be altered via the user-to-company account; (iii) selected data sources are encrypted in the vehicles memory and vehicle operators servers; (iv) retrieval of the encrypted data is accomplished through user authentication within the users account; (v) uses content selective encryption as a means of controlling user personal data; (vi) does not control the cars systems in any way, instead causes selected data to be encrypted to support personal user data privacy; (vii) a change to a vehicles destination would be handled through the vehicle operators systems after the user authenticates to that system and selects a destination change; (viii) individuals have control over location and sensor based data collected using the exemplar of the individual as a client of autonomous vehicles; (ix) selectively 'hides' personal information including location; (x) ensures basic vehicle information needed to be tracked by the vehicle owner is not significantly impacted, for instance by obscuring precise location information; (xi) the vehicle operator has sufficient information to aid in the servicing of the vehicle while the clients exact location is protected; (xii) implements methods of securing a user's privacy; and (xiii) describes a methodology of encrypting data transmitted over a network or within a vehicle.

Some embodiments of the present invention may include one, or more, of the following operations, features, characteristics and/or advantages: (i) the ability to use a PUM (potentially unwanted modification) to store retrieved encrypted data to which the user is entitled; (ii) biometric identifiers could be supported by the vehicle operator and by prearrangement with the users voice; (iii) fingerprint or other biometric identification could be used in place of a user identification and password; (iv) if the vehicle operator employs facial recognition software and hardware on its vehicles or supplements internet based access to authenticate users, then this authentication/access could be also employed; (v) solves the concern of data privacy across the entire spectrum of personal data use; and (vi) allows personal data control (as a vendor privacy feature offering), while preserving the value of the data.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for use by a vehicle passenger taking a trip a vehicle equipped with a vehicle computer and global positioning system (GPS) tracking system, the computer-implemented method comprising:

prior to the start of the trip, receiving a first user input indicating that locational data from the GPS tracking system should be subject to enhanced security;

receiving a second user input indicating the type and degree of encryption to be used to encrypt a high granularity version of GPS locational data; and responsive to receipt the first user input: (i) providing low granularity version of GPS locational data collected during the trip to the vehicle passenger, (ii) encrypting and saving a high granularity version of the GPS locational data during the trip according to a type and degree of encryption specified by the second user input, and (iii) providing the vehicle passenger with an encryption key that can be used to decrypt the high granularity version of the GPS locational data for the trip.

2. A computer program product (CPP) for use by a vehicle passenger taking a trip a vehicle equipped with a vehicle computer and global positioning system (GPS) tracking system, CPP comprising:

a set of storage device(s); and computer code stored collectively in the set of storage device(s), with the computer code including data and instructions to cause a processor(s) set to perform at least the following operations:

prior to the start of the trip, receiving a first user input indicating that locational data from the GPS tracking system should be subject to enhanced security, receiving a second user input indicating the type and degree of encryption to be used to encrypt a high granularity version of GPS locational data, and responsive to receipt the first user input: (i) providing low granularity version of GPS locational data collected during the trip to the vehicle passenger, (ii) encrypting and saving a high granularity version of the GPS locational data during the trip according to the type and degree of encryption specified by the second user input, and (iii) providing the vehicle passenger with an encryption key that can be used to decrypt the high granularity version of the GPS locational data for the trip.

3. A computer system (CS) for use by a vehicle passenger taking a trip a vehicle equipped with a vehicle computer and global positioning system (GPS) tracking system, the CS comprising:

a processor(s) set;

a set of storage device(s); and computer code stored collectively in the set of storage device(s), with the computer code including data and instructions to cause the processor(s) set to perform at least the following operations:

prior to the start of the trip, receiving a first user input indicating that locational data from the GPS tracking system should be subject to enhanced security, receiving a second user input indicating the type and degree of encryption to be used to encrypt a high granularity version of GPS locational data, and responsive to receipt the first user input: (i) providing low granularity version of GPS locational data collected during the trip to the vehicle passenger, (ii) encrypting and saving a high granularity version of the GPS locational data during the trip according to a type and degree of encryption specified by the second user input, and (iii) providing the vehicle passenger with an encryption key that can be used to decrypt the high granularity version of the GPS locational data for the trip.

* * * * *